(No Model.) 2 Sheets—Sheet 1.

W. H. WHITTEMORE.
APPARATUS FOR TRUING AND BURNISHING METALLIC BEARING SURFACES.

No. 577,973. Patented Mar. 2, 1897.

Witnesses:
Jno. E. Parker
J. Henderson

Inventor:
Wm. H. Whittemore,
by his Attorney, (No Model.) 2 Sheets—Sheet 2.
W. H. WHITTEMORE.
APPARATUS FOR TRUING AND BURNISHING METALLIC
BEARING SURFACES.
No. 577,973. Patented Mar. 2, 1897.
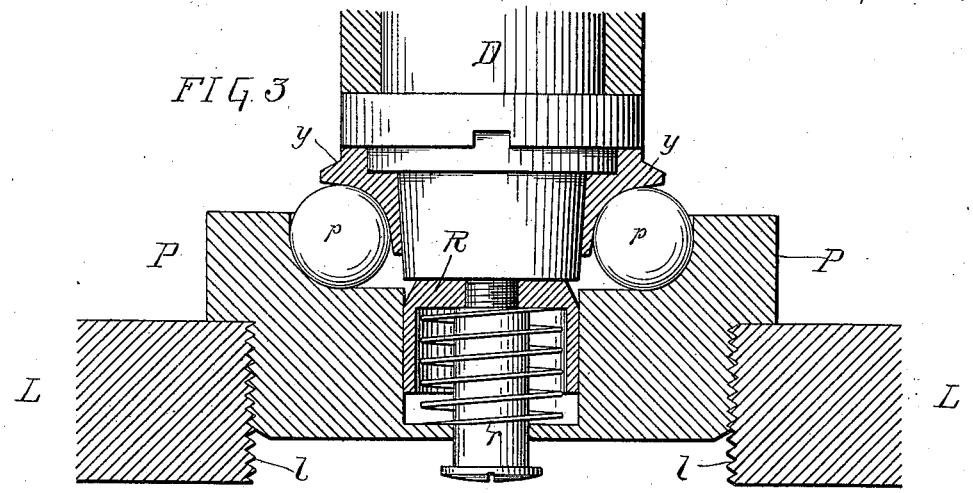
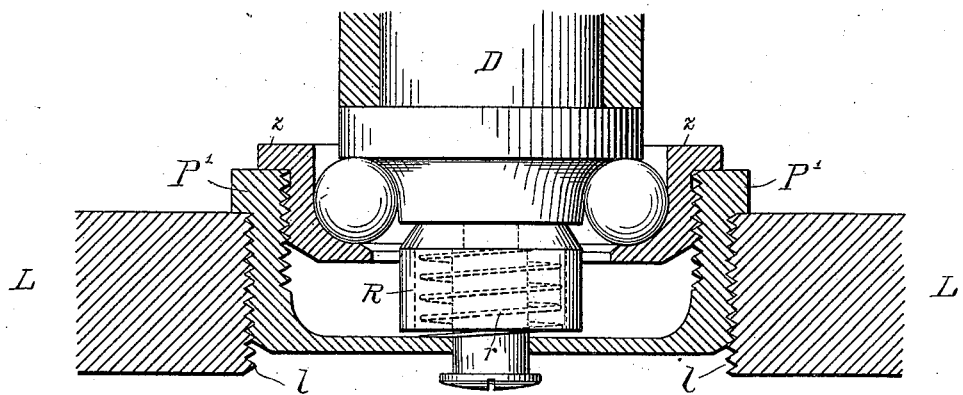
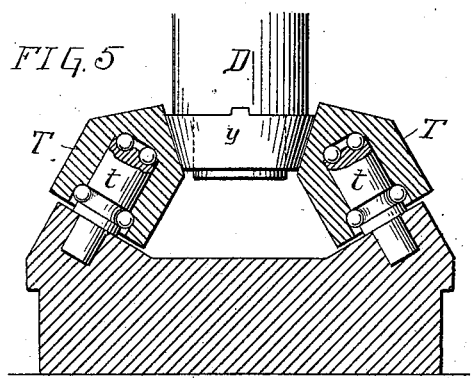
Witnesses:
Jno. C. Parker
J. Henderson.
Inventor:
Wm. H. Whittemore,
by his Attorney,

UNITED STATES PATENT OFFICE.

WILLIAM HENRY WHITTEMORE, OF ROCKAWAY, NEW JERSEY.

APPARATUS FOR TRUING AND BURNISHING METALLIC BEARING-SURFACES.

SPECIFICATION forming part of Letters Patent No. 577,973, dated March 2, 1897.

Application filed May 27, 1896. Serial No. 593,226. (No model.)

*To all whom it may concern:*

Be it known that I, WILLIAM HENRY WHITTEMORE, a citizen of the United States, and a resident of Rockaway, State of New Jersey, have invented a certain new and Improved Apparatus for Truing and Burnishing Metallic Bearing-Surfaces, of which the following is a full, clear, and exact description, reference being had to the accompanying drawings, forming part of this specification.

The object of my invention is to provide for the production of smooth surfaces on bearings exposed to frictional wear, and is designed more particularly for the truing, smoothing, and burnishing of the ball-bearing surfaces employed in bicycle structures.

In carrying out my invention I propose to subject the surface which is to be treated to the frictional contact of rolling surfaces under great pressure and at a high rate of speed, as more fully set forth hereinafter.

Figure 1:
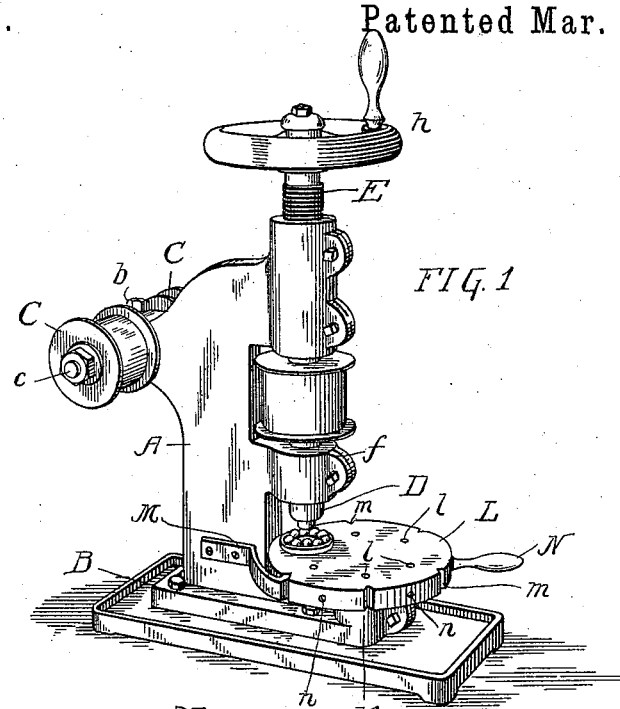
Figure 2:
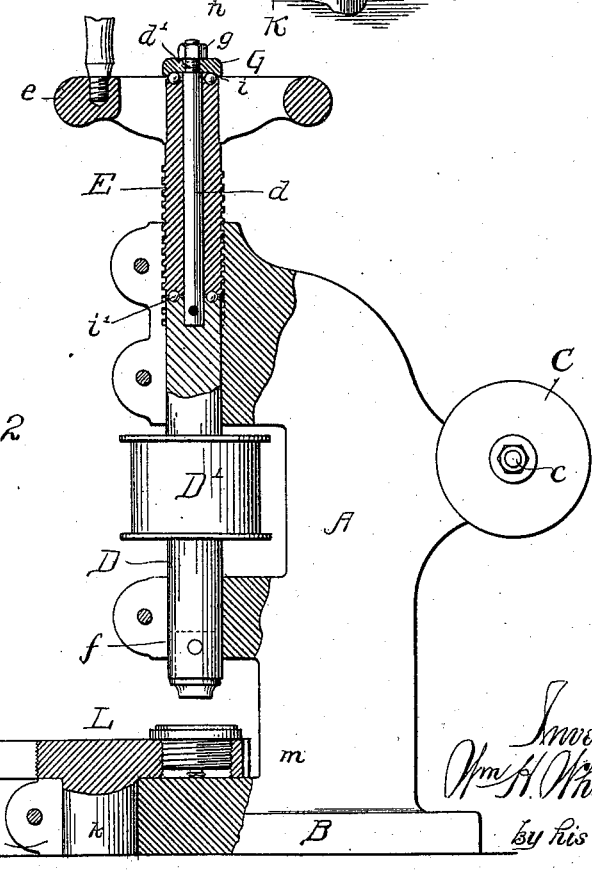

In the accompanying drawings, Figure 1 is a perspective view of an apparatus constructed in accordance with my invention. Fig. 2 is a sectional elevation of the same. Fig. 3 is an enlarged sectional elevation illustrating the rolling of a smooth surface on a cone forming part of a ball-race. Fig. 4 is a similar view showing the manner of rolling a smooth surface in a cup forming the opposite half of the ball-race, and Fig. 5 is a sectional elevation illustrating a modification of the invention.

Referring first to Figs. 1 and 2, A represents a suitable standard rising from a base B and provided with a rear bearing $b$ for a shaft $c$, carrying belt-guiding wheels C. The upper portion of the frame is threaded at $c'$ for the reception of a handled screw E, which may be raised and lowered, as required, by the turning of the hand-wheel $e$.

D represents a suitable spindle having its upper portion reduced in diameter or connected to a smaller spindle $d$, terminating at its upper end in a threaded bolt $d'$, passing through a cap-piece G and provided with an adjusting-nut $g$. The spindle D finds a lower bearing at $f$ in the frame, and its upper smaller end is guided by the screw E, and in order that the pressure exerted by the spindle in working shall not affect the screw I provide at the upper and lower ends thereof ball-races $i\ i'$, in which are placed suitable antifriction-balls, so that on the turning of the screw the spindle may be more readily raised and lowered and when the lower end of the spindle is pressed by the screw into frictional contact with the polishing-balls the wear on the spindle will be less and its rotation be effected with considerably less power than could be done in the absence of the ball-bearings. The spindle D has a belt-wheel D', over which a suitable driving-belt may be guided by the wheels C.

On the base of the machine is provided a suitable bearing K for the reception of the central spindle or pivot $k$ of a revoluble table L, preferably circular in form and provided with a series of threaded openings $l$, any one of which may be brought directly under the spindle D in a line coincident with the axis thereof. On the periphery of the revolving table are a series of notches $m$, disposed one opposite or in line with each of the openings $l$, and into which may enter the end of a spring holding-finger M, secured to the frame of the machine, the position of the operating end of the spring being such that when in engagement with one of the notches $m$ it will firmly hold one of the openings $l$ in position beneath the spindle D. For convenience in turning the table the edge of the latter is provided with a series of openings $n$, to which may be adjusted a turning-handle N.

If the surface of a cone is to be polished, a suitable cup P, of hardened metal, is screwed into one of the openings $l$ of the table L, said cup having a very hard bearing-surface, on which are placed hardened-steel balls $p$, the latter being normally held in position during the intervals between the truing or burnishing operations by a plunger R, held up within the circle of balls by a coiled compression-spring $r$, as shown more clearly in Fig. 3.

The cone $y$ to be burnished is placed on the spindle D and is forced by the turning of the screw with considerable pressure into frictional contact with the balls $p$, the spindle being meantime rapidly revolved and the pressure given by the screw being increased or diminished, as may be necessary, by turning the handle $h$. When the spindle descends, it depresses the plunger R and holds the same down in the position shown in Fig. 3, and when the spindle rises after the operation is completed the plunger follows it and passes slightly within the circle of balls, so as to hold the same properly in position in the bearing-cup for the reception of the next cone to be polished.

The spindle D is removable or the lower portion thereof is made detachable, so that when a cup is to be polished a hardened-steel spindle having its lower end shaped as shown in Fig. 4 may be employed, the cup z to be polished being screwed within a suitable cup P, provided in one of the openings l of the table, and the polishing-balls p being placed in position within the cup previous to the descent of the spindle. In this case also a spring-plunger R may be employed to hold the balls in place while the spindle is moving to a polishing position.

The apparatus may be modified in various ways, and if necessary the table L may be stationary and only a single opening l be formed therein, any suitable device being employed in place of the screw for forcing the spindle into frictional contact with the polishing-balls, or, as shown in Fig. 5, the balls may be replaced by conical polishing-rollers T, mounted on studs t and provided with suitable ball-bearings for the easy rotation of the rollers on the studs, and such rollers may be removable, so that rollers having slightly-curved faces, either convex or concave, may be substituted for the rollers having straight faces.

I have found in actual practice that the ball-bearing surfaces may be trued, condensed, smoothed, and burnished in the manner described with but a few seconds' contact with the hardened rollers, and a smooth, true, and easy-running surface is produced at a very small cost.

Of course it will be understood that the machine may be constructed in such manner that the cup will revolve and the spindle remain stationary without departing from my invention.

Having thus described my invention, what I claim, and desire to secure by Letters Patent, is—

1. In combination, a rotatable spindle, a ball-bearing surface, hardened-steel balls running loosely on said ball-bearing surface, with means for rotating said spindle and for forcing the same into contact with said balls.

2. A device for truing and polishing ball-bearing surfaces, comprising a rotatable part having a curved periphery, mechanism for holding the bearing to be acted upon, polishing-balls running loosely on the surface of the bearing to be acted upon, and mechanism for forcing said rotatable part against the polishing-balls for effecting the rotation of said balls by frictional contact therewith.

3. The combination of the ball-bearing cup, devices for holding the same, a rotatable spindle, hardened polishing-balls running loosely between the spindle and the cup, and means for forcing said spindle into contact with said balls for effecting the rotation of the same.

4. The combination of the rotatable spindle, a stationary ball-bearing surface adapted to receive and contain a circular row of polishing-balls, a plunger, and a spring normally tending to raise said plunger vertically within said ball-bearing surface and within the circle of balls to confine said balls in position, substantially as specified.

5. The combination of the frame, a spindle mounted therein, devices for rotating said spindle and vertically adjusting the same, a bearing-surface, and polishing-balls running loosely therein, substantially as specified.

6. The combination of the frame, the rotatable spindle, the revoluble table having threaded openings in its upper face and edge holding notches, a spring adapted to engage with and hold said notches, peripheral openings in the table, and a handle adjustably secured in one of said openings.

In witness whereof I have hereunto set my hand this 20th day of May, A. D. 1896.

WILLIAM HENRY WHITTEMORE.

Witnesses:
H. R. TERHUNE,
THOS. H. PEINSTON.